Oct. 27, 1970  G. F. PICKENS ET AL  3,537,106
MOTION PICTURE PROJECTOR GATE SYSTEM FOR
ACCOMMODATING MULTIPLE FILM FORMATS
Filed Dec. 26, 1967  2 Sheets-Sheet 2

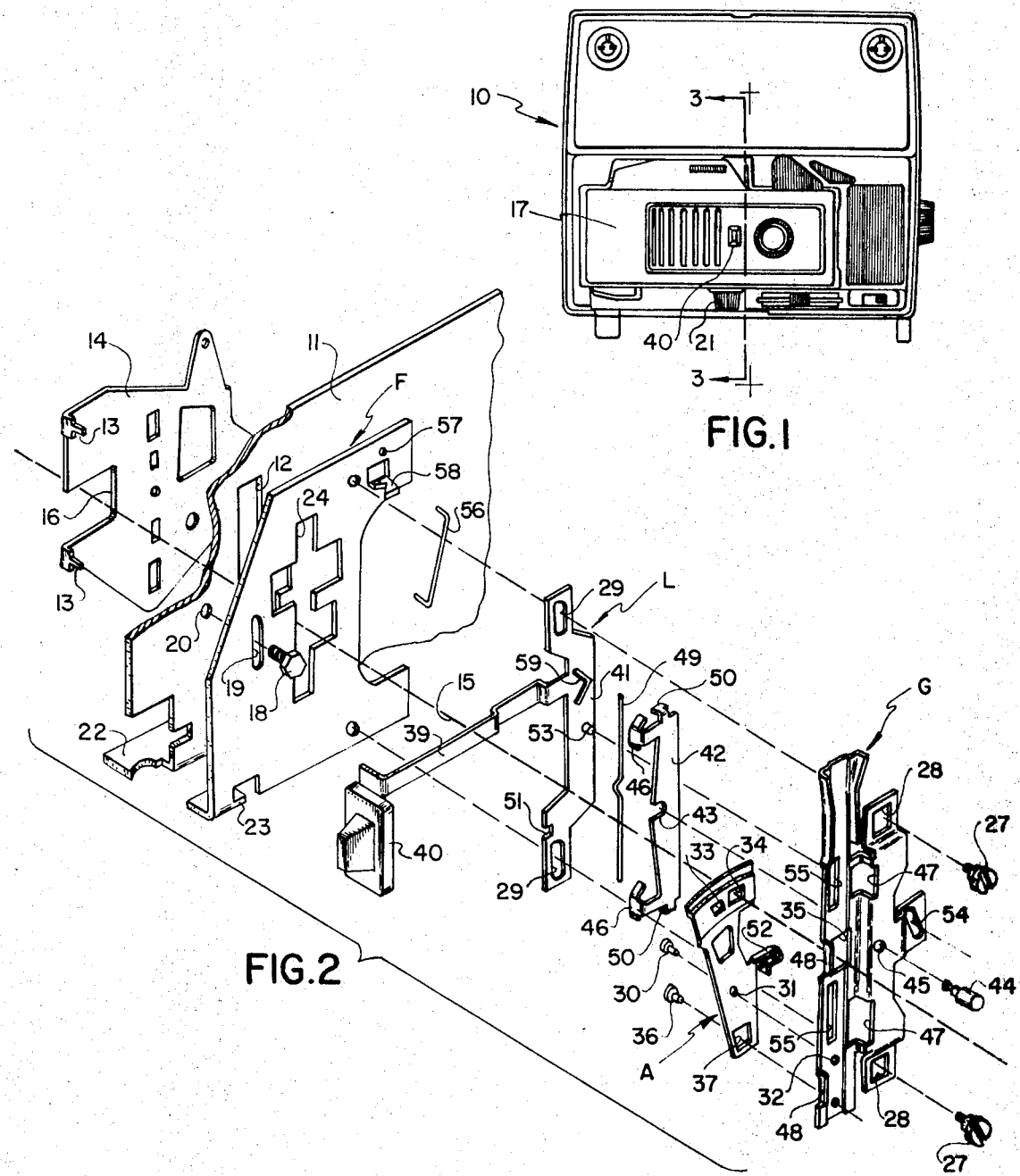

GERALD F. PICKENS
THOMAS G. KIRN
PHILLIP N. CRAWFORD
INVENTORS

BY Gary D. Field
Robert W. Hampton
ATTORNEYS

United States Patent Office 3,537,106
Patented Oct. 27, 1970

3,537,106
MOTION PICTURE PROJECTOR GATE SYSTEM FOR ACCOMMODATING MULTIPLE FILM FORMATS
Gerald F. Pickens, Thomas G. Kirn, and Philip N. Crawford, Rochester, N. Y., assignors to Eastman Kodak Company, Rochester, N.Y., a corporation of New Jersey
Filed Dec. 26, 1967, Ser. No. 693,486
Int. Cl. G03b 41/00
U.S. Cl. 352—79   6 Claims

ABSTRACT OF THE DISCLOSURE

An aperture plate having apertures corresponding in size to the film frame size of super 8 and regular 8 format is rotatable between selective positions and the film gate is movable laterally for selectively positioning the perforations of either format in alignment with the film-feed mechanism. Both of these movements may be accomplished by a single control lever. The film-feed mechanism has a stroke and a claw spacing that is suitable for either regular 8 or super 8 projection without adjustment.

CROSS-REFERENCES TO RELATED APPLICATIONS

Reference is made to commonly assigned copending U.S. applicatiton Ser. No. 567,724, now abandoned entitled "Motion Picture Projector," filed July 25, 1966, in the name of Robert J. Roman; U.S. patent application Ser. No. 654,004, entitled "Motion Picture Projector," filed on July 17, 1967, in the name of John J. Bundschuh et al., now Pat. No. 3,402,006; and U.S. patent application Ser. No. 693,379, entitled "Motion Picture Projector Gate System for Accommodating Multiple Film Formats," filed on even date herewith in the name of Gerald F. Pickens et al.

BACKGROUND OF THE INVENTION

This invention relates to an improved motiion picture projector adapted to selectively project types of motion picture film which differ in frame size and perforation arrangement. More particularly, the invention relates to a projector which may be utilized to project 8 mm. film of either the regular 8 or super 8 film format.

DESCRIPTION OF THE PRIOR ART

In order to improve the picture quality of 8 mm. film, a new frame format known as super 8 is being utilized which increases the image area. This increase in picture area is accomplished by reducing the width of the perforations which are now placed closer to the edge of the film and opposite the center of each frame. Since the overall width of these two film formats is the same, they may be guided through the same film guide past a projectioin aperture. However, the difference in the lateral location of the line of perforations and the relative spacing makes it difficult to project both film formats from the same projector. The prior art has sought to overcome this problem by providing either separate claw mechanisms for each format or adjustable claw mechanisms whose stroke may be varied to accommodate the format being projected. Also, some devices provide shiftable side guides to adjust the lateral position of the film. Since the size of the image frame changes, means also must be provided to change the size of the gate aperture. This has been accomplished in the prior art by a movable member having two openings corresponding to the film formats which may be selectively aligned with the optical system of the projector. In some cases, a mechanism is provided which will change the aperture size and switch claw mechanisms or adjust a single claw mechanism in one operation to correspond to the film format being projected. Other devices provide a mechanism which simultaneously change the aperture size and shift the film side guides. Still other devices provide multiple sprockets which must be shifted to accommodate different formats. However, such structure tends to be quite complicated, thereby increasing the overall cost of a projector which is capable of accommodating both the regular 8 and super 8 formats. Also, the lateral shifting of the film required by some mechanisms may damage the film..

SUMMARY OF THE INVENTION

The present invention overcomes these difficulties by providing a pull-down mechanism with a film engaging member such as a claw having a cross-section smaller than the perforations of films having different perforations and format dimensions and by using a single compromise claw movement that will work with different film formats. The difference in lateral location of the perforations relative to the edge of the film of each format is compensated for by laterally shifting a film gate with respect to the axis of the pull-down mechanism to a position where the claw can engage the perforations of the desired format. The difference in picture frame size is compensated for by selectively adjusting the size of correspond to the desired format as by positioning openings in an aperture plate. Conveniently, a single means is provided whereby the aperture adjustment and the lateral shifting of the film gate to position the film can be accomplished simultaneously.

Additional novel features of this inventiton will become apparent from the description which follows, taken in conjunction with the accompanying drawings.

BRIEF DESCRIPTION OF THE DRAWINGS

FIG. 1 is a side elevation of a movie projector, on a reduced scale, utilizing the gate system of this invention;

FIG. 2 is an exploded view of the parts of the gate system of this invention;

DESCRIPTION OF THE PREFERRED EMBODIMENT

Figure 3:
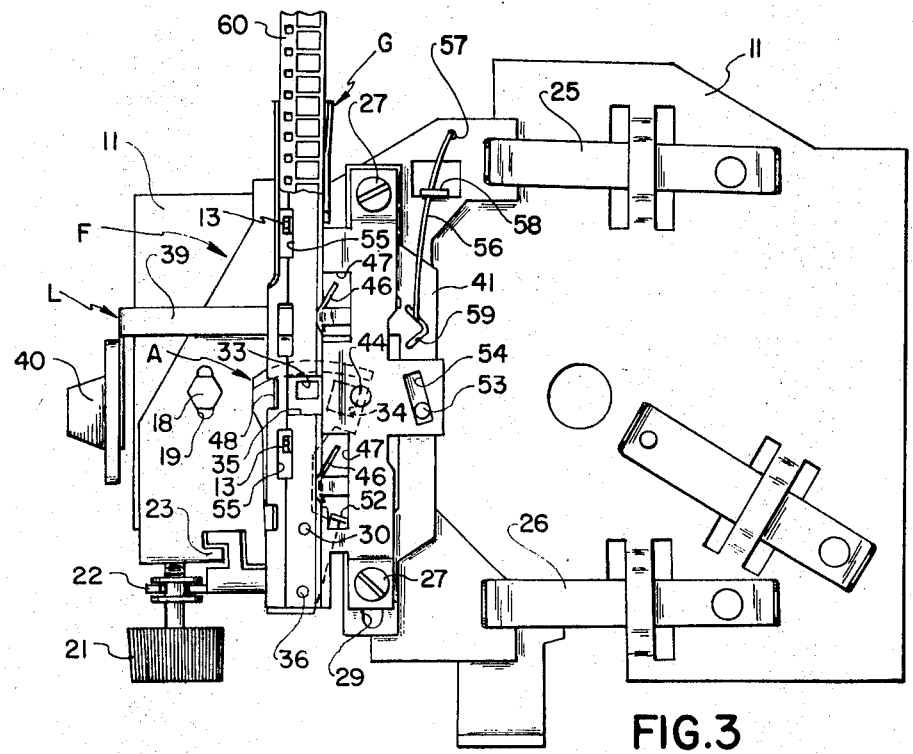
FIG. 3 is a vertical section, on an enlarged scale, taken along line 3—3 of FIG. 1, showing the gate system in the regular 8 film format position.
Figure 4:
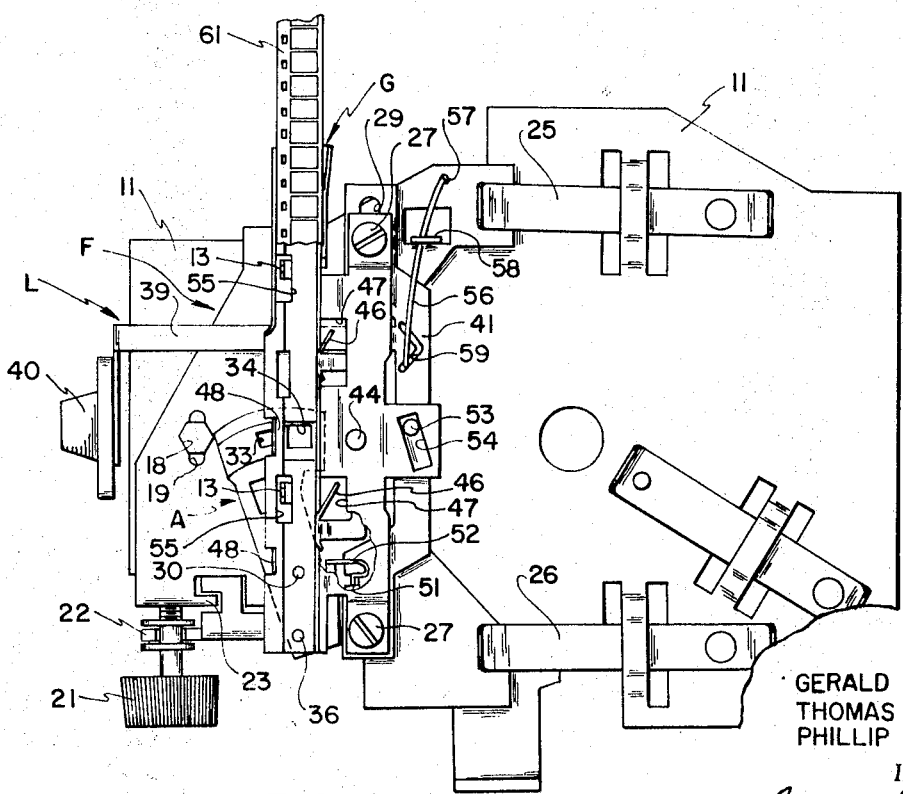
FIG. 4 is a vertical section, similar to FIG. 3, but showing the gate system in the super 8 film format position.

In accordance with this invention a projector 10 is provided, shown in FIG. 1 provided with gate system which may be utilized for projecting either regular 8 or super 8 film. As best seen in FIGS. 2–4, the gate system includes a support 11 having a vertical slot 12 through which a pair of spaced claws or teeth 13 of the film advance or pull-down mechanism 14 may extend. Conveniently, the claw teeth 13, which define a generally vertical axis of the pull-down mechanism, are of a cross-section which is smaller than the perforations of either the regular 8 or super 8 film format so that they will accommodate either format. The pull-down mechanism is mounted for reciprocal up-and-down movement by suitable drive means (not shown) within the projector. As seen in FIG. 2, the optical axis 15 of the projector passes through slot 12 and also through an opening 16 in pull-down mechanism 14 so that a beam of light from the projection lamp (not shown) within housing 17 of FIG. 1 may pass therethrough. The difference in vertical location from one perforation to the next in each format is compensated for by using a single compromise claw stroke that will work with either format. The difference between ten perforations of regular 8 film is the same as the distance between 9 perforations of super 8 film, i.e., 1.500 inches. Thus, this spacing is used between claws 13 so that they can acept either format. Since there is a common claw stroke and since pull-down mechanism 14 is not shifted vertically when the format is changed, it is desirable to select an appropriate distance above and below optical axis 15 for claws 13 to engage the film so that the horizontal center line of both the super 8 and regular 8 projected image will nearly coincide with the horizontal centerline of the optical system.

A framing plate F is adjustably attached to the opposite side of support 11 by means of a screw 18 extending through vertical slot 19, adjacent the left hand edge of the framing plate, into a threaded hole 20 in support 11. Slot 19 permits vertical adjustment of the framing plate for framing the pictures by means of adjustment knob 21 of FIGS. 3 and 4 extending between flange 22 of support 11 and flange 23 of framing plate F. Framing plate F is also provided with a large vertical slot 24, aligned with vertical slot 12 of support 11 for accommodating claws 13 of pull-down mechanism 14 and aligned with optical axis 15. The righthand edge of the framing plate conveniently may be held by a pair of spaced leaf springs 25 and 26 attached to support 11, shown in FIGS. 3 and 4. The springs serve to hold the framing plate against support 11 but permit vertical movement upon actuation of framing knob 21.

Film gate G is attached to the opposite side of framing plate F by means of spaced screws 27 extending through spaced openings 28 therein and through spaced elongated openings 29 of operating level L into holes in framing plate F. Thus, operating lever L is held between framing plate F and film gate G. Conveniently, holes 28 are wider than pins 27 to permit lateral movement of film gate G to align the film perforations with claws 13, as discussed below. The term "film gate," as used herein, includes fixed and movable side guides, rails, an aperture mask and a pressure plate, all of which are assembled as one unit and are shifted together to change from one film format to another.

An aperture mask A is pivoted to film gate G by means of a pivot pin 30 extending through a hole 31 in aperture mask A and into a threaded hole 32 in film gate G. The pivotal movement of aperture mask A about pin 30 permits one of the laterally positioned apertures 33 and 34 to be aligned with an opening or aperture 35 in film gate G which lies along optical axis 15. The amount of rotation is controlled by a pin 36 extending through an opening 37 in aperture mask A, which is larger than the pin, and received in threaded hole 38 of film guide G. Thus, when aperture 33 lies within optical axis 15, pin 36 will engage one side of opening 37 and when aperture 34 lies within the optical axis pin 36 will engage the opposite side of opening 37. Operating lever L includes an arm 39 which may be moved up and down by means of a switch 40 on one end thereof. The other end of arm 39 is connected to a vertical plate 41 in which spaced vertical slots 29 are located.

A resiliently mounted movable guide plate 42 has a laterally extending central notch 43 which is received over a pin 44 extending through opening 45 on film gate G. Side guides 46 at opposite ends of plate 42 are normally urged through openings 47 in film gate G to hold the film against fixed side guides 48 of film guide G by a spring 49 which engages spaced lugs 50 on the guide adjacent plate 42. Plate 41 has an inwardly extending notch 51 adjacent the lower of slots 29 for receiving U-shaped spring arm 52 on aperture mask A to pivot the aperture mask upon upward and downward movement of operating lever L. A projecting pin 53 on plate 41 engages a diagonal slot 54 which, due to the camming action therebetween, causes film gate G to move laterally during operation of operating lever L. This movement is permitted by holes 28 which are wider than screws 27. Thus, movement of the operating lever causes film gate G to be shifted laterally, so that claws 13 which project through openings 55 will engage the perforations in the film, and aperture mask A, which is attached thereto, to be shifted therewith and to be rotated to place the appropriate aperture in the optical axis aligned with film aperture 35.

Another spring member 56 holds operating lever L in either the raised position of FIG. 4 or the lowered position of FIG. 3. Thus, the upper end extends through a hole 57 in framing plate F while the body of the spring passes through a groove 58 with the other end extending into an angular V-shaped slot 59 on plate 41 of operating lever L.

The operation of the gate system can now be understood best by looking at FIGS. 3 and 4. In FIG. 3, operating lever L is shown in its lowermost position so that film gate G is located in the lefthand position by pon 53 which is located at the lower end of diagonal slot 54, and aperture mask A is positioned so that the smaller aperture 33 is aligned with opening 35 for viewing regular 8 film 60. This alignment is assured by engagement of pin 36 with the righthand edge of opening 37. It will be noted the claws 13 are positioned at the righthand edge of slots 55, i.e., toward the center of film gate G for engagement with the perforations in regular 8 film 60. Lever L is held in the lowermost position by spring 56 whose lower end engages the upper portion of V-shaped groove 59.

To change to the super 8 format position, it is merely necessary to push upwardly on switch 40 so that operating level L is raised to the position shown in FIG. 4. This movement causes film gate G and aperture mask A to be moved or shifted to the right by the camming action of pin 53 in slot 54, with respect to the axis of claws 13, which are now at the lefthand edge of openings 55, i.e., nearer the edge of film gate G, with the perforations in the super 8 film 61. The vertical movement lever L will also cause aperture mask A to be rotated about pivot pin 30 through spring arm 52 which is in engagement with notch 51 of plate 41, and pin 36 will engage the opposite edge of opening 37 so that larger aperture 34 is aligned with opening 35 of film gate G.

From the foregoing, it can be seen that the novel features of this invention have been fulfilled to marked degree. A single operating lever L may be moved to cause a lateral shift of film gate G and movement of the aperture plate A so that films having different formats, may be projected by the same projector, as desired. Since the entire film guide is shifted rather than the film being slid across portions thereof, there is little possibility that the film will be damaged.

The invention has been described in detail with particular reference to the preferred embodiment thereof, but it will be understood that variations and modifications can be effected within the spirit and scope of the invention.

We claim:

1. In a motion picture projector adapted to selectively project an image, through a projection aperture defining means, of one of a plurality of films of the same width but having different formats, wherein the frame size and location of the perforations with respect to an edge of the film each differ from one format to the other format, a gate system comprising:

a shiftable film gate for guiding film past said projection aperture defining means;

means for advancing film past said projection aperture defining means, said film advancing means having a longitudinal axis;

a pivotal aperture mask having means defining a plurality of openings, each opening defining means corresponding in size to said frame size of one of said formats, said mask being rotatable to selective positions to align one of said opening defining means with said projection aperture defining means; and
a single control member coupled to both said film gate and said aperture mask movable between different positions to simultaneously rotate said aperture mask to one of said selective positions and to shift said film gate laterally with respect to the axis of said film advancing means to align said film for engagement by said film advancing means with the perforations of said film.

2. In a motion picture projector, as claimed in claim 1, wherein said control member includes:
an operating lever; and
cam means coupling said lever to said film gate so that movement of said lever causes said lateral movement of said film gate to be transversely to said lever movement.

3. In a motion picture projector, as claimed in claim 1, further including:
a framing plate; and
means attaching said control member and said film gate to said framing plate to restrict the movements thereof to relatively transverse movements.

4. In a motion picture projector, as claimed in claim 1, further including:
means pivotally attaching said aperture mask to said film gate and restricting movement of said film gate to said lateral movement.

5. In a motion picture projector, as claimed in claim 1, further including:
a framing plate; and
latch means interconnecting said framing plate and said control member to hold said control member in said selective positions.

6. In a motion picture projector, as claimed in claim 5, further including:
means defining an angular slot, in one of said framing plate and said control member, having upper and lower portions; and
a spring member having one end attached to the other of said framing plate and said control member and having another end movable within said angular slot defining means between said upper and lower portions upon movement of said control member between said selective positions to hold said control member in any of said selective positions after movement.

References Cited

UNITED STATES PATENTS 3,427,101    2/1969    Jorgensen et al. _____ 352—79

JOHN M. HORAN, Primary Examiner

M. H. HAYES, Assistant Examiner